United States Patent [19]

Summa

[11] 3,917,042
[45] Nov. 4, 1975

[54] MAGNETIC CLUTCH

[76] Inventor: Hubert Wayne Summa, 4200 Dr. Greaves Road, Grandview, Mo. 64030

[22] Filed: Apr. 29, 1974

[21] Appl. No.: 465,180

[52] U.S. Cl.................. 192/84 A; 192/108; 64/9 R
[51] Int. Cl.² ........................................ F16D 19/00
[58] Field of Search...... 192/84 A, 108, 67 R, 53 D; 64/9 R

[56] References Cited
UNITED STATES PATENTS

| | | | |
|---|---|---|---|
| 1,907,619 | 5/1933 | Soden-Fraunhofen.............. | 192/108 |
| 2,055,723 | 9/1936 | Hope ................................ | 192/84 A |
| 2,724,474 | 11/1955 | Hopp ................................ | 192/84 A |
| 2,733,795 | 2/1956 | Christie............................. | 192/108 |
| 3,171,145 | 3/1965 | Benjamin et al.................... | 192/108 |
| 3,624,767 | 11/1971 | Kroeger............................. | 192/84 A |

Primary Examiner—Samuel Scott
Assistant Examiner—Randall Heald
Attorney, Agent, or Firm—Fishburn, Gold & Litman

[57] ABSTRACT

A magnetic clutch has a tooth structure particularly adapted for quick movement into driving and meshing engagement at high rotary speeds and to permit quick disengagement between clutch faces of facing first and second clutch members each operatively connected to respective coaxially aligned members, such as a driving member and a driven member respectively in response to selective energizing and deactivation of an electro-magnetic component associated with the first and second clutch members wherein each tooth structure comprises a projection extending from the respective clutch face and having an end surface with one of a leading edge and a trailing edge thereof being closer to the respective clutch face than the other of the leading edge and the trailing edge whereby the end surface of each of the projections extending from the clutch face of the first clutch member defines an inclined ramp to guide the end surface of a respective one of the projections extending from the clutch face of the second clutch member during movement thereof toward driving and meshing engagement and during rotation of the first clutch member.

3 Claims, 10 Drawing Figures

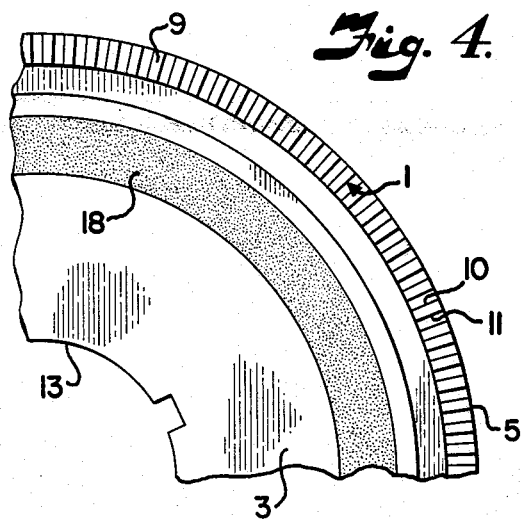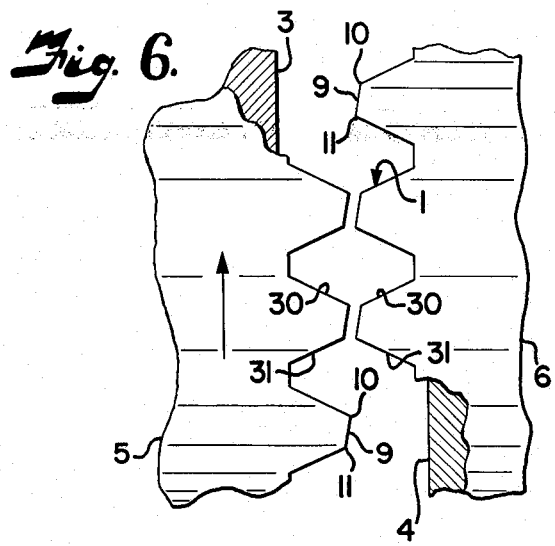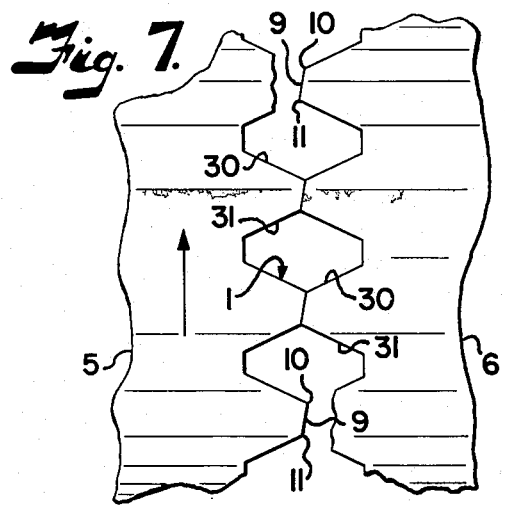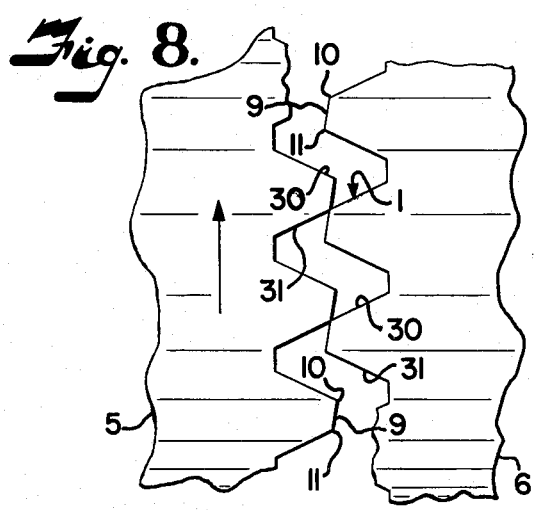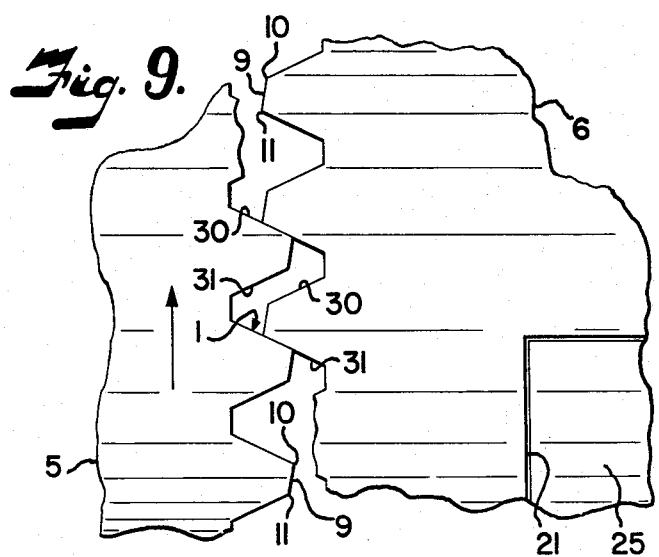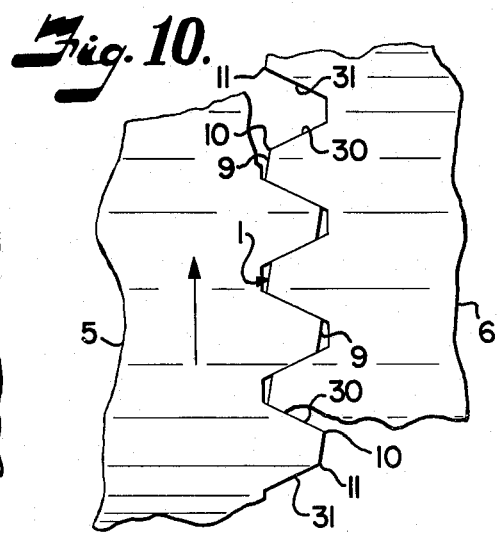

MAGNETIC CLUTCH

The present invention relates to magnetic clutches and more particularly to a tooth structure for use in a magnetic clutch and particularly adapted for quick movement into driving and meshing engagement at high rotary speeds and to provide quick disengagement between facing clutch members upon deactivation of an electro-magnetic field.

The principle objects of the present invention are: to provide a magnetic clutch and tooth structure therefor particularly adapted for meshing engagement at high rotary speeds and to provide quick disengagement between respective clutch faces of facing first and second clutch members each operatively connected to respective coaxially aligned driving and driven members; to provide such a magnetic clutch and tooth structure therefor adapted to provide driving engagement of a substantial portion of a leading surface of tooth structures on a driving clutch face with a substantial portion of a respective trailing surface of tooth structures on a driven clutch face; to provide such a magnetic clutch and a tooth structure therefor which avoids rounded corners which occur in magnetic clutches having conventional tooth structures on facing clutch faces; to provide such a magnetic clutch having tooth structures adapted to move into full meshing engagement during free running of driving and driven members; to provide such a magnetic clutch having a tooth structure adapted to have clearance between the tooth structure and the respective facing clutch face when in full meshing engagement; to provide such a magnetic clutch having tooth structures adapted for quick disengagement and thereby quick stopping of a driven member upon deactivation of an electro-magnetic field; to provide such a magnetic clutch and tooth structure therefor particularly adapted to be operated in response to signals of a tape program for operating high speed machine tools and the like; to provide such a magnetic clutch wherein the driven member is adapted to have operatively connected thereon one of a plurality of tools, such as drills, milling tools, machining tools, cutters and the like; and to provide such a magnetic clutch and tooth structure therefor which is economical to manufacture, durable in construction, positive in operation, and particularly well adapted for the proposed use.

Other objects and advantages of this invention will become apparent from the following description taken in connection with the accompanying drawings wherein are set forth by way of illustration and example certain embodiments of this invention.

The drawings constitute a part of the specification and include an exemplary embodiment of the present invention and illustrate various objects and features of the magnetic clutch and tooth structure therefor.

FIG. 4 is an enlarged fragmentary elevational view of a clutch face of the other clutch member.

FIG. 6 is a further enlarged side elevational view showing tooth structures on facing clutch faces positioned in a disengaged or clearance position.

FIG. 7 is also a further enlarged side elevational view showing initial engagement of tooth structures of facing clutch faces.

FIG. 8 is also a further enlarged side elevational view showing a position of an attracted clutch face with tooth structures thereon positioned between initial engagement and driving engagement.

FIG. 9 is also a further enlarged side elevational view showing driving engagement between tooth structures on facing clutch faces.

FIG. 10 is also a further enlarged side elevational view showing full meshing engagement of tooth structures on facing clutch faces.

Figure 1:
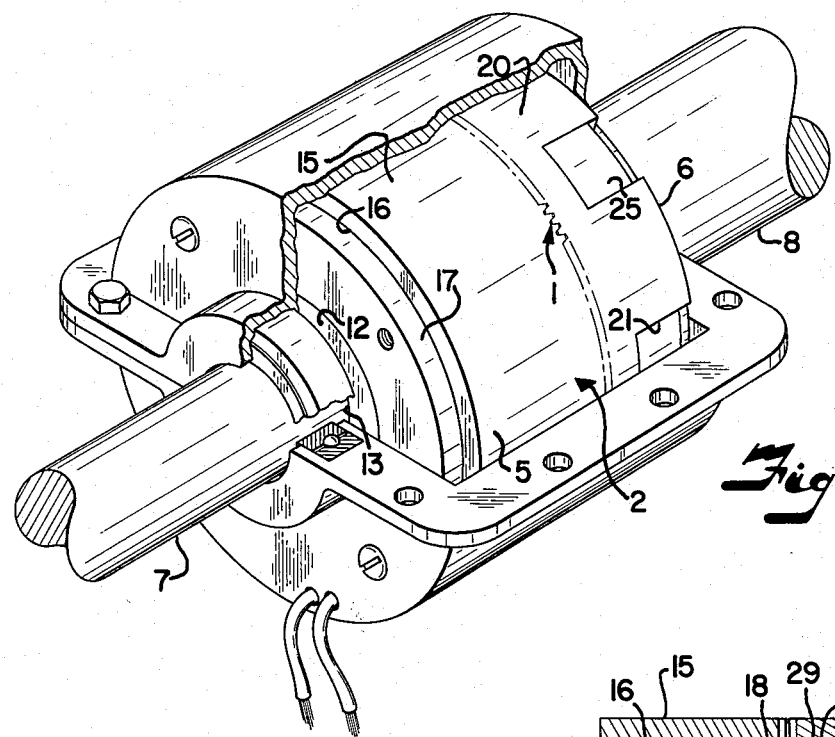
FIG. 1 is a perspective view of a magnetic clutch embodying features of the present invention and with facing clutch faces thereof each having tooth structures thereon adapted for quick movement into and out of driving and meshing engagement.

Referring more in detail to the drawings:

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designates a tooth structure for use in a magnetic clutch 2 and particularly adapted for driving and meshing engagement at high rotary speeds and to permit quick disengagement between clutch faces 3 and 4 of facing first and second clutch members 5 and 6 respectively which are operatively connected to respective coaxially aligned first and second members, such as a driving shaft 7 and a driven shaft 8 respectively, in response to selective energizing and deactivation of an electro-magnetic field wherein each tooth structure 1 comprises a radially elongate projection extending from the respective clutch face 3 and 4 and raving an end or front surface 9 with one of a leading edge 10 and a trailing edge 11 thereof being closer to the respective clutch face 3 and 4 than the other of the leading edge 10 and the trailing edge 11 whereby each end surface 9 of the projections extending from the clutch face 3 of the first clutch member 5 defines as inclined ramp to guide the end surface 9 of the respective projections extending from the clutch face 4 of the second clutch member 6 during movement thereof toward driving and meshing engagement and during rotation of the first clutch member 5.

In the illustrated structure, the first clutch member 5 is a driving clutch member and is operatively connected to a source of power or driving member, such as the driving shaft 7. The illustrated first clutch member 5 has a tubular sleeve portion 12 having a bore 13 extending longitudinally therethrough and coaxial with and adapted to receive the driving shaft 7 therein. The source of power, such as the driving shaft 7, is suitably connected to the tubular sleeve portion 12, as by a key 14 received in suitable aligned guideways or slots in the interior surface of the bore 13 and in the exterior surface of the driving shaft 7.

The clutch face 3 extends from one end of the sleeve portion 12 and is substantially normal or perpendicular thereto. A flange 15 extends outwardly from a peripheral edge of the clutch face 3 and is positioned in overlying and spaced relation with an exterior surface of the sleeve portion 12 to define therebetween an annular recess 16 adapted to receive an electro-magnetic component 17, such as a core and coil electrically connected to a source of electrical current for selectively energizing and deactivating the component 17 to thereby selectively create a magnetic field. The clutch face 3 has an annular wear or bearing member 18 formed of material which is resistant to frictional engagement and a material which may be non-magnetic when in a magnetic field.

The second clutch member 6 is adapted to be driven by the first clutch member 5 and to be attracted to or moved toward the clutch face 3 of the first clutch member 5 by energizing the electromagnetic component 17 and in the illustrated structure, the second clutch member 6 has a sleeve or bore 19 extending through the clutch face 4 and substantially coaxially aligned with a structure to be rotated, such as the second member or driven shaft 8. The second clutch member 6 has a flange 20 extending outwardly from the peripheral edge of the clutch face 4 and having a plurality of circumferentially spaced recesses 21 therein, for a purpose later described.

The second clutch member 6 is operatively connected to the driven member or shaft 8 in any suitable manner, and in the illustrated structure, the clutch face 4 has a plurality of circumferentially spaced apertures 22 extending therethrough and substantially parallel with a longitudinal axis of the driven member or shaft 8.

The second clutch member 6 supports a bearing member 23 formed of material adapted to be non-magnetic in a magnetic field, such as brass, or the like. The bearing member 23 is illustrated as an annular member having a bore 24 therethrough which is coaxially aligned with the bore or sleeve 19 in the clutch face 4 of the second clutch member 6. The bearing member 23 has a plurality of circumferentially spaced projections 25 extending outwardly from the peripheral surface thereof and each being adapted to be received in a respective one of the recesses 21 in the flange 20 of the second clutch member 6. The bearing member 23 is suitably secured or connected to the second clutch member 6, as by a plurality of circumferentially spaced screws 26 extending through the annular bearing member 23 and the clutch face 4 of the second clutch member 6. The driven member or shaft 8 suitably supports the second clutch member, as by a plurality of fingers 27 each extending parallel with the longitudinal axis of the bore 24 in the bearing member 23 and each adapted to be received in a respective one of the plurality of apertures 22 in the clutch face 4 and the annular bearing member 23 thereby permitting movement of the second clutch member 6 toward and away from the first clutch member 5.

The magnetic clutch 2 includes means for effecting separation of the clutch faces 3 and 4 upon deactivation of the electro-magnetic component 17 and the magnetic field. In the illustrated structure, a certain number of the apertures 22 have one end thereof at least partially closed to provide an abutment for one end of a plurality of spaced resilient members 28 each having an end or shoe portion 29 mounted on the other end thereof and positioned to be in sliding engagement with the annular wear member 18 on the clutch face 3 of the first clutch member 5.

The tooth structures 1 are arranged in a first annular band or row of a plurality of circumferentially spaced radially extending teeth on the clutch face 3 of the first clutch member 5. The end or front surface 9 of each of the tooth structures or teeth on the clutch face 3 of the first clutch member 5 is spaced from the clutch face 3 and has a leading edge 10 and a trailing edge 11. The trailing edge 11 of each of the tooth structures or teeth 1 on the clutch face 3 of the first clutch member 5 is closer to the clutch face 3 than the leading edge 10 of each of the teeth 1 on the clutch face 3. The leading edge 10 of each of the teeth 1 on the clutch face 4 of the second clutch member 6 is closer to the clutch face 4 than the trailing edge 11 of the teeth 1 on the clutch face 4 on the second clutch member 6.

Each tooth structure on the clutch face 3 and each tooth structure on the clutch face 4 has a leading side surface 30 extending between the respective clutch face and the leading edge 10 of the respective tooth structure 1. The leading side surface 30 of each of the tooth structures 1 on the clutch face 3 of the first clutch member 5 has a greater surface area than the leading side surface 30 of the tooth structures 1 on the clutch face 4 of the second clutch member 6, as can be seen in FIGS. 6 to 10 inclusive.

The tooth structures 1 each have a trailing side surface 31 extending between the respective clutch face and the trailing edge of the respective tooth structure. The trailing side surface 31 of each of the teeth or tooth structures 1 on the clutch face 3 of the first clutch member 5 has a substantially smaller surface area than the leading side surface 30 of the teeth or tooth structures 1 extending from the clutch face 3 of the first clutch member 5. The trailing side surface 31 of each of the teeth or tooth structures 1 extending from the clutch face 4 of the second clutch member 6 has a substantially larger surface area than the leading side surface 30 of the tooth structures or teeth 1 extending from the clutch face 4 of the second clutch member 6.

Figure 3:
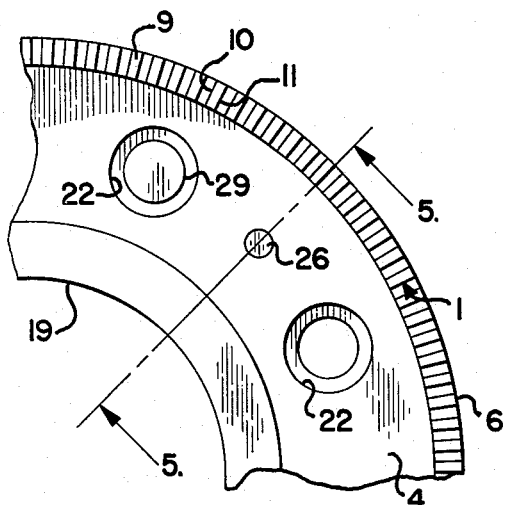
FIG. 3 is an enlarged fragmentary elevational view of a clutch face of one of the first and second clutch members.
Figure 2:
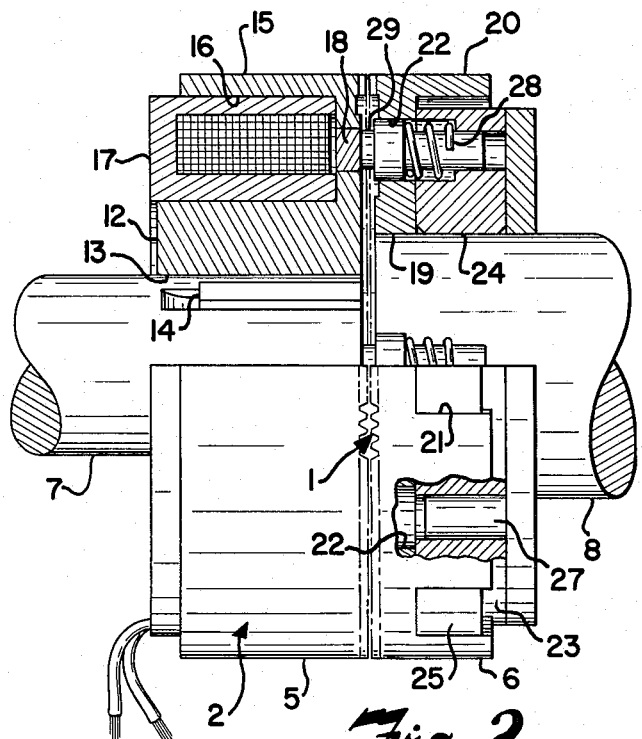
FIG. 2 is a side elevational view of the magnetic clutch with portions broken away to better show the component parts thereof.
Figure 5:
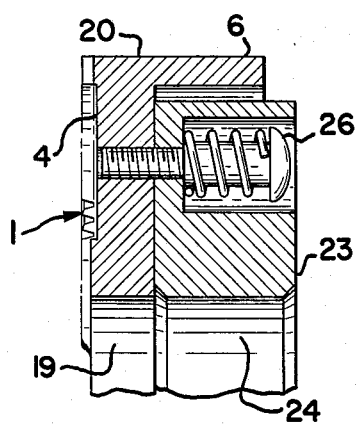
FIG. 5 is an enlarged fragmentary longitudinal sectional view taken on line 5—5, FIG. 3 and showing resilient means for effecting quick disengagement of clutch faces.

As best seen in FIGS. 3 and 4, the teeth or tooth structures 1 on the clutch face 3 and the clutch face 4 have a long dimension thereof extending radially of the longitudinal axis of the respective driving member 7 and the driven member 8 to thereby provide substantial surface area for each leading side surface 30 on the teeth or tooth structures 1 extending from the clutch 3 of the driving clutch member 5 to each be engaged by the trailing side surface 31 of a respective one of the teeth or tooth structures 1 extending from the driven or second clutch member 6.

The tooth structures or teeth 1 each have substantially similar cross sections and are thicker adjacent the respective mating or clutch face 3 or 4 than adjacent the respective end or front surface 9 thereof. The leading side surface 30 and the trailing side surface 31 each intersect the respective mating or clutch face 3 or 4 in a manner to form an acute angle between the respective surface and a plane passing through the axis of the clutch or a plane normal or perpendicular to the respective mating face and extending from the intersection of the respective leading or trailing side surface and the respective mating or clutch face. The leading and trailing side surfaces diverge from the front surface 9 of the respective tooth and the acute angles are each substantially equal and each in the nature of 20° to 30°.

The end surface 9 of each of the teeth or tooth structures 1 is inclined so that the end or front surface 9 of the teeth or tooth structures 1 extending from the first mating or clutch face 3 defines a ramp for movement of the end surface 9 of the teeth or tooth structures 1 extending from the other or second mating or clutch face 4 during movement toward driving and meshing engagement. Each end surface 9 is positioned to form an acute angle between a plane parallel with the respective clutch or mating face 3 or 4 and extending from the leading edge 10 thereof and, the respective end surface 9. The acute angles are substantially equal and each in the nature of 5° to 15°.

The teeth or tooth structures 1 are arranged in an annular band on the respective clutch face 3 or 4 and are circumferentially spaced in the respective annular band. Each tooth structure is narrower at the outer edge or end than at the respective mating or clutch face 3 or 4. The teeth each have sloping sides and are each substantially similar to an acme thread or a spur gear tooth.

Operation of a magnetic clutch 2 constructed as illustrated and described includes energizing the electro-magnetic component 17 which is received in the annular recess 16 of the first clutch member 5 thereby causing the first clutch member to become a temporary magnet. The field created by the electro-magnetic component 17 causes the second clutch member 6 to also become a temporary magnet and be attracted to the first clutch member 5 and move from a position, as shown in FIG. 6, with clearance or spacing between the teeth or tooth structures 1 on the clutch faces 3 and 4. Upon energizing the electro-magnetic component 17, the second clutch member 6 moves toward the first clutch member 5 with the end surfaces 9 of the teeth or tooth structures 1 on the clutch face 4 each being moved into engagement with a respective one of the end surfaces 9 on the clutch face 3. This position is best shown in FIG. 7. The first or driving clutch member 5 continues to rotate while the second or driven clutch member 6 is moving toward the first clutch member 5 in response to establishing the magnetic field by the electro-magnetic component 17. The teeth or tooth structures 1 on the second clutch member 6 are each moved along a respective ramp defined by the end surfaces 9 of the teeth 1 on the clutch face 3 in response to rotation of the first clutch member 5 and operation of the electro-magnetic component 17 and thereby move each of the teeth 1 on the clutch face 4 of the second clutch member 6 into a respective space between adjacent teeth 1 on the clutch face 3 of the first clutch member 5. This intermediate position is best shown in FIG. 8. Continued rotation of the first or driving clutch member 5 and continued movement of the second or driven clutch member 6 toward the first clutch member 5 effects driving engagement of the second clutch member 6 by the first clutch member 5, as best seen in FIG. 9 wherein the trailing side surface 31 of each of the teeth 1 on the clutch face 4 of the second clutch member 6 is moved into engagement with a substantial portion of the leading side surface 30 of a respective one of the teeth 1 on the clutch faces 3 of the first clutch member 5. Free running of the driving member 7 and the driven member 8 before working engagement of the second or driven member 8 permits the electromagnetic component 17 to move the teeth on the clutch face 3 and clutch face 4 into full meshing engagement, as shown in FIG. 10. It has been found that movement of the second or driven clutch member 6 toward the first clutch member 5 during rotation of the first or driving clutch member 5 and the inclined surface or ramp of the teeth 1 on the clutch face 3 effects substantially improved penetration of each of the teeth 1 on the clutch face 4 into a respective one of the spaces between adjacent teeth 1 on the clutch face 3 and thereby substantially improved driving engagement between leading side surfaces 30 of the teeth 1 on the clutch face 3 and trailing side surfaces 31 of the teeth 1 on the clutch face 4.

It is to be understood that while I have illustrated and described one form of my invention, it it not to be limited to the specific form or arrangement of parts herein described and shown.

What I claim and desire to secure by Letters Patent is:

1. A magnetic clutch comprising:

a. a rotatably mounted driving member and a rotatably mounted driven member positioned in substantial coaxial longitudinal alignment one with the other;

b. a first clutch member operatively mounted on said driving member and rotatable therewith, said first clutch member having a clutch face positioned substantially normal to a longitudinal axis of said driving member;

c. a second clutch member operatively mounted on said driven member and rotatable therewith, said second clutch member having a clutch face positioned substantially normal to a longitudinal axis of said driven member, said clutch face of said second clutch member being in facing relation with said clutch face of said first clutch member, said second clutch member being mounted for selective movement of said clutch face thereof toward and away from said clutch face of said first clutch member;

d. a first plurality of circumferentially spaced teeth on said clutch face of said first clutch member, said teeth being arranged in an annular band and each having an end surface spaced from said clutch face of said first clutch member, said end surface each having a leading edge and a trailing edge, said trailing edges each being positioned closer to said clutch face of said first clutch member than said respective leading edges;

e. a second plurality of circumferentially spaced teeth on said clutch face of said second clutch member and adapted to mesh with said teeth on said clutch face of said first clutch member, said teeth of said second plurality of teeth being arranged in an annular band and each having an end surface spaced from said clutch face of said second clutch member and each having a leading edge and a trailing edge, said leading edges of said second plurality of teeth each being positioned closer to said clutch face of said second clutch member than said respective trailing edges;

f. electro-magnetic means associated with each of said first clutch member and said second clutch member for selectively effecting meshing engagement between said first and second plurality of teeth;

g. means associated with each of said first clutch member and said clutch member for effecting separation of said first and second plurality of teeth upon deactivation of said electro-magnetic means comprising:

1. an annular member having a wear face positioned substantially coplanar with said clutch face of said first clutch member; and
2. a plurality of spaced resilient members mounted on said second clutch member and each having an end portion positioned to be in sliding engagement with said wear face of said annular member, said resilient members each being adapted to urge said clutch face of said second clutch member away from said clutch face of said first clutch member and being adapted to resist movement of said clutch face of said second clutch member toward said clutch face of said first clutch member until overcome by activation of said electro-magnetic means for effecting meshing engagement between said first and second plurality of teeth.

2. In a magnetic clutch having driving and driven coaxial rotary first and second clutch members having adjacent faces, an elector-magnet means and resilient means associated with each of said first and second clutch members to selectively effect relative axial movement of said clutch members toward each other for driving engagement and away from each other for separation thereof:

a. an annular series of radial teeth on said adjacent faces of the first and second clutch members, said teeth being circumferentially spaced with the teeth on the first clutch member adapted to coact with the teeth on the second clutch member;
b. each of said radial teeth on the first and second clutch members having a front surface inclined to a plane perpendicular to the axis of the clutch and opposed side surfaces oppositely and substantially equally inclined to a plane passing through the axis of the clutch to thereby diverge and provide the respective tooth with a greater width at the base than at the front surface;
c. The inclination of the front surfaces of the teeth providing a mating relation of the front surfaces of the teeth on the first clutch member with the front surfaces of the teeth on the second clutch member and the circumferential spacing being equal for meshing of the teeth of the first clutch member with the teeth of the second clutch member for driving engagement.

3. In a magnetic clutch as set forth in claim 2 wherein:
a. each tooth on said first and second clutch member have leading side surfaces and trailing side surfaces;
b. said leading side surfaces on the teeth of said first clutch member and said trailing side surfaces on the teeth of the second clutch member having substantially greater surface area than the trailing side surfaces of the teeth of said first clutch member and the leading side surfaces on the teeth of the second clutch member.

* * * * *